United States Patent
Nyström et al.

(10) Patent No.: US 6,334,058 B1
(45) Date of Patent: Dec. 25, 2001

(54) METHOD AND APPARATUS FOR RADIO POWER ALLOCATION TO A CHANNEL DURING CHANNEL ASSIGNMENT BASED ON CURRENT SYSTEM CONDITIONS

(75) Inventors: Martin Nyström, Bjärnum; Kjell Klasson, Hästveda, both of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/141,774

(22) Filed: Aug. 27, 1998

(30) Foreign Application Priority Data

Aug. 28, 1997 (SE) .................................................. 9703092

(51) Int. Cl.$^7$ ..................................................... H04Q 7/20
(52) U.S. Cl. .......................................... 455/453; 455/522
(58) Field of Search ............................ 330/135; 455/436, 455/450, 452, 453, 522, 561, 127, 341

(56) References Cited

U.S. PATENT DOCUMENTS

| | | |
|---|---|---|
| 4,941,200 | 7/1990 | Leslie et al. . |
| 5,333,175 * | 7/1994 | Ariyavisitakul ........................ 379/58 |
| 5,499,395 * | 3/1996 | Doi ...................................... 455/33.1 |
| 5,579,306 | 11/1996 | Dent . |
| 5,752,197 * | 5/1998 | Rautiola ............................. 455/522 |
| 5,862,459 * | 1/1999 | Charas ................................ 455/114 |
| 5,991,284 * | 11/1999 | Willenegger ........................ 370/335 |
| 5,991,627 * | 11/1999 | Honkasalo .......................... 455/437 |
| 6,035,208 * | 3/2000 | Osawa ................................ 455/522 |
| 6,041,241 * | 3/2000 | Willey ................................ 455/574 |
| 6,047,189 * | 4/2000 | Yun .................................... 455/452 |

FOREIGN PATENT DOCUMENTS

| | | |
|---|---|---|
| 0 214 319 | 3/1987 | (EP) . |
| 98/05129 | 2/1998 | (WO) . |

* cited by examiner

*Primary Examiner*—Daniel Hunter
*Assistant Examiner*—Nick Corsaro
(74) *Attorney, Agent, or Firm*—Burns, Doane, Swecker & Mathis, L.L.P.

(57) ABSTRACT

In a method and apparatus for power allocation used by a BTS in a mobile telephone system, an available radio power is distributed between a plurality of carriers, a request for a channel for communication (201a,201b,201c) is received. A required amount of power is requested from a power bank (202), and a check if the required amount of power is available (203) is performed. If the power is available it is allocated (204, 205), and the connection is established (206).

11 Claims, 4 Drawing Sheets

METHOD AND APPARATUS FOR RADIO POWER ALLOCATION TO A CHANNEL DURING CHANNEL ASSIGNMENT BASED ON CURRENT SYSTEM CONDITIONS

BACKGROUND

The present invention relates generally to a method and an apparatus for power allocation used by a BTS (base transceiver station) in a mobile telephone system, and more particularly to a method and an apparatus wherein an available radio power is distributed between a plurality of carriers.

Cellular radio is a technique that provides mobile telephony by using the allotted radio band in an efficient manner. Cellular telephone service involves the subdivision of a service area into a number of smaller cells to facilitate frequency-reuse and an increasing number of users. In these new cellular systems micro computer based switches can follow a moving object by way of power and signal quality measurements from the numerous antennas that constitute the cellular system and order the mobile object to change the frequency according to the cell of the object. Each cell requires a BTS (base transceiver station) and an antenna operating in a frequency-band with a power output just sufficient to cover the area of the cell. The BTS:s are connected to a BSC (Base Station Controller) which performs the switching function as well as the tracking of the users. When the user with the mobile telephone moves from one cell to another the BSC must, owing to signal quality or to achieve load sharing among different antennas by peaks in the traffic, hand over an ongoing call from the original antenna to another more suitable antenna. Cellular systems are based on both analogue and digital transmission. Digital cellular systems provide the best quality with the least amount of bandwidth. Different kinds of principles are used for digital cellular systems. One of these is the TDMA-principle (Time Division Multiple Access), which transmission is in the form of a repetitive sequence of frames, each of which is divided into a number of slots. All the users sharing the physical resource are dedicated to a particular time slot within a group of time slots.

Another principle for cellular systems is the CDMA-technology (Code Division Multiple Access). This is probably the next generation of digital cellular systems.

A cellular system or cellular network comprises various subsystems, devices and equipment. A base transceiver station (BTS) or a base station (BS) is one of the most important subsystems in a cellular network, which base station is the mobile interface to the network. The base station doesn't have to be located in the centre of a cell, but the antenna usually is. The cell size is limited by the determined transmitting power of the base station. Further, a base station may have several transceivers, each of which represents a separate RF (Radio Frequency) channel. A state of the art radio frequency power amplifier is designed to handle one carrier at a time, independent of the other carriers.

In sites used for mobile telephony, the maximum radio power available for each carrier is determined considering each particular cell radius.

Cells are planned for different coverage, and, therefore, BTS:s have to be provided with transceivers of various performance.

SUMMARY OF THE INVENTION

It is an object of the present invention to provide improved method and apparatus for accomplishing power allocation used by a BTS in a mobile telephone system, wherein an available radio power is distributed between a plurality of carriers, a determined coverage for a particular amount of total radio power being obtained.

Another object of the invention is to provide an opportunity to distribute the available radio power freely between carriers within one MCPA (Multiple Carrier Power Amplifier).

A further object of the invention is to implement functionality in distributing radio power to each carrier according to its requirements.

Additionally, it is an object of the invention to distribute and allocate power at least when calls are established, during ongoing calls, and by release of connections.

With the present invention the total amount of the radio power of the carriers within one MCPA will never be allowed to exceed the limits of the MCPA at any time.

A still further object of the invention is to provide a new degree of freedom in cell planning, where different grade of services for different call location distributions within one cell are achieved.

A benefit of the invention is the gain in cell coverage at a fixed amount of available power.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION

Figure 1:
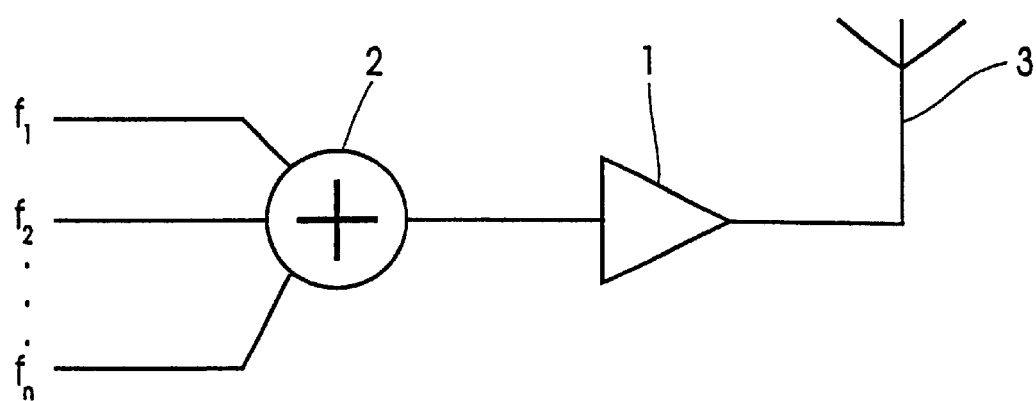
FIG. 1 is a schematic view of the MCPA principle.

FIG. 1 illustrates an MCPA (Multiple Carrier Power Amplifier) system or apparatus in accordance with the present invention. This MCPA-system is a subsystem of a complete base station. Further, the MCPA-system includes a multiple carrier power amplifier 1, the input of which is connected to a combiner 2 and its output is connected to an antenna 3. Of course this MCPA-system includes a lot of other devices but they are not shown in FIG. 1 in order to make the illustration as clear as possible.

In this solution several carriers $f_1, f_2, \ldots, f_n$ can share the same radio power amplifier 1. The maximum available and shareable power is determined considering a plurality of reasons, for example the power of the power amplifier 1. For example, if a hundred Watt MCPA is used with ten carriers, this results in ten Watt per carrier, minus losses and margins, if a fixed power distribution is used.

The MCPA principle according to the invention provides a system and a method for distribution of the available radio power freely between carriers within one MCPA.

Figure 2:
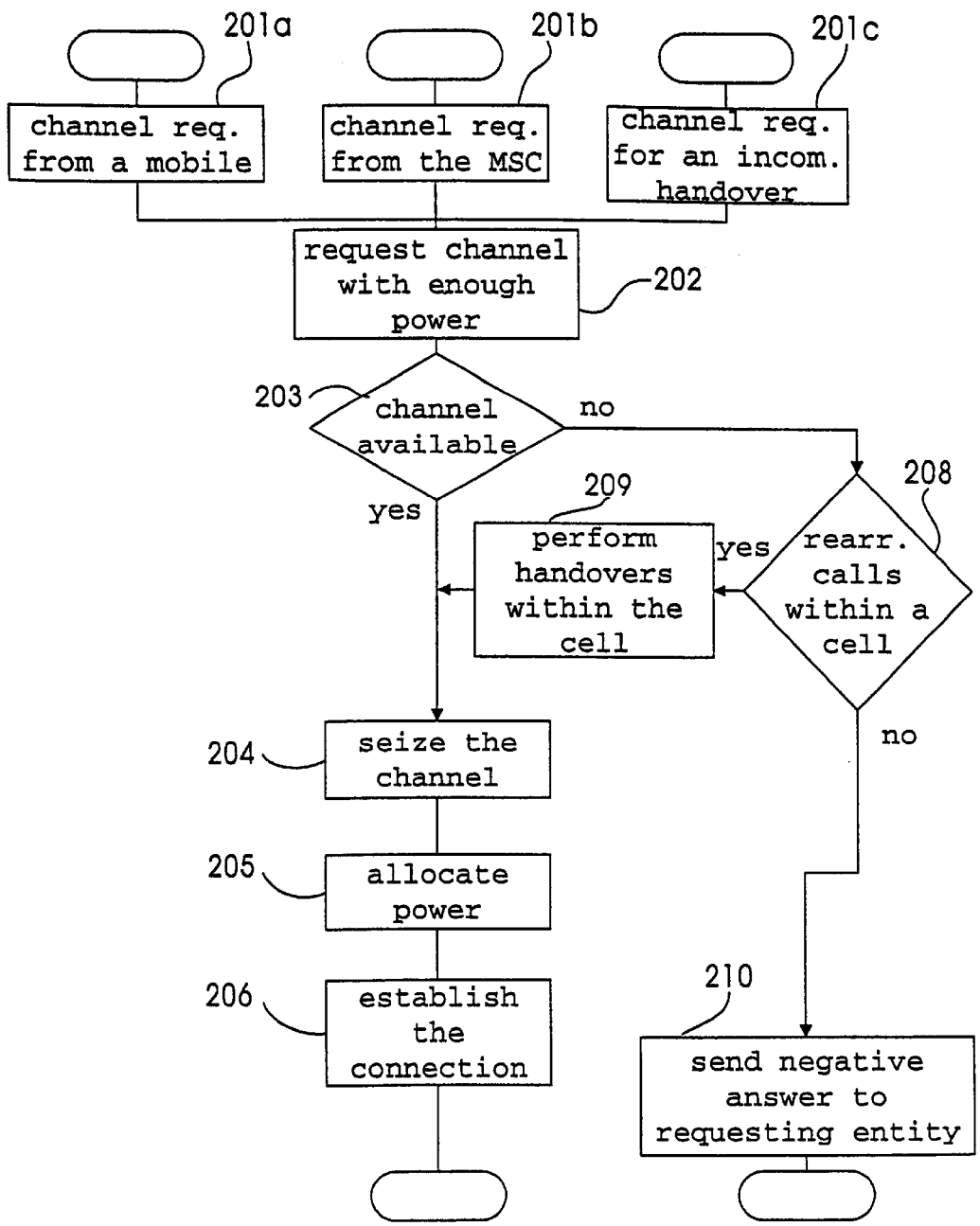
FIG. 2 is a flow chart for call set-up, according to the method of the invention.

One embodiment of the invention is provided for the GSM (Global System for Mobile communications). The cell is dimensioned for a maximum output power which constitutes the upper limit for each carrier. With reference to FIG. 2, a request for a channel for communication is received at step 201a. In another case a channel request can be received from a mobile switching centre (MSC), which is the interface of the cellular network to the public switched telephone network (PSTN). The MSC provides routing of calls from the public network via a base station controller (BSC) and the base station to an individual mobile station. This MSC-channel request is represented by step 201b in FIG. 2. A handover within a cell or between two cells give rise to a third case, which is a channel request for an incoming handover, represented by the step 201c.

Before the allocation of a traffic channel, a required amount of power is requested from a "power bank" owned by a function, for example located in the BSC. Said function controls the total amount of available power per time slot, so the limit of the MCPA never will be exceeded. Power can be requested and allocated from the power bank and when the power no longer is needed it can be released to the power bank. A channel with enough power is requested at step 202.

If the requested amount of power is available in a time slot, step 203, the power is allocated and the call set-up will proceed. When the channel is seized at step 204, the power is allocated at step 205. Finally, the connection is established and a positive answer is sent to the requesting entity (the mobile telephone, the MSC, or another cell) at step 206.

If not enough power is available, calls have to be rearranged either within the cell or between cells. The possibility to rearrange calls within the cell is checked at step 208. Then, if enough power is available within the cell and if the requested amount of power could be satisfied by releasing power from another time slot within the cell, handover is performed and the required amount of power is transferred between the time slots in the power bank at step 209. Further, the power is allocated at step 205, the connection is established, and a positive answer is sent to the requesting entity (the mobile telephone, the MSC, or another cell) at step 206. If not enough power is available in a time slot or if it is not possible to do the rearrangement of calls within the cell a negative answer is sent to the requesting entity at step 210.

Figure 3:
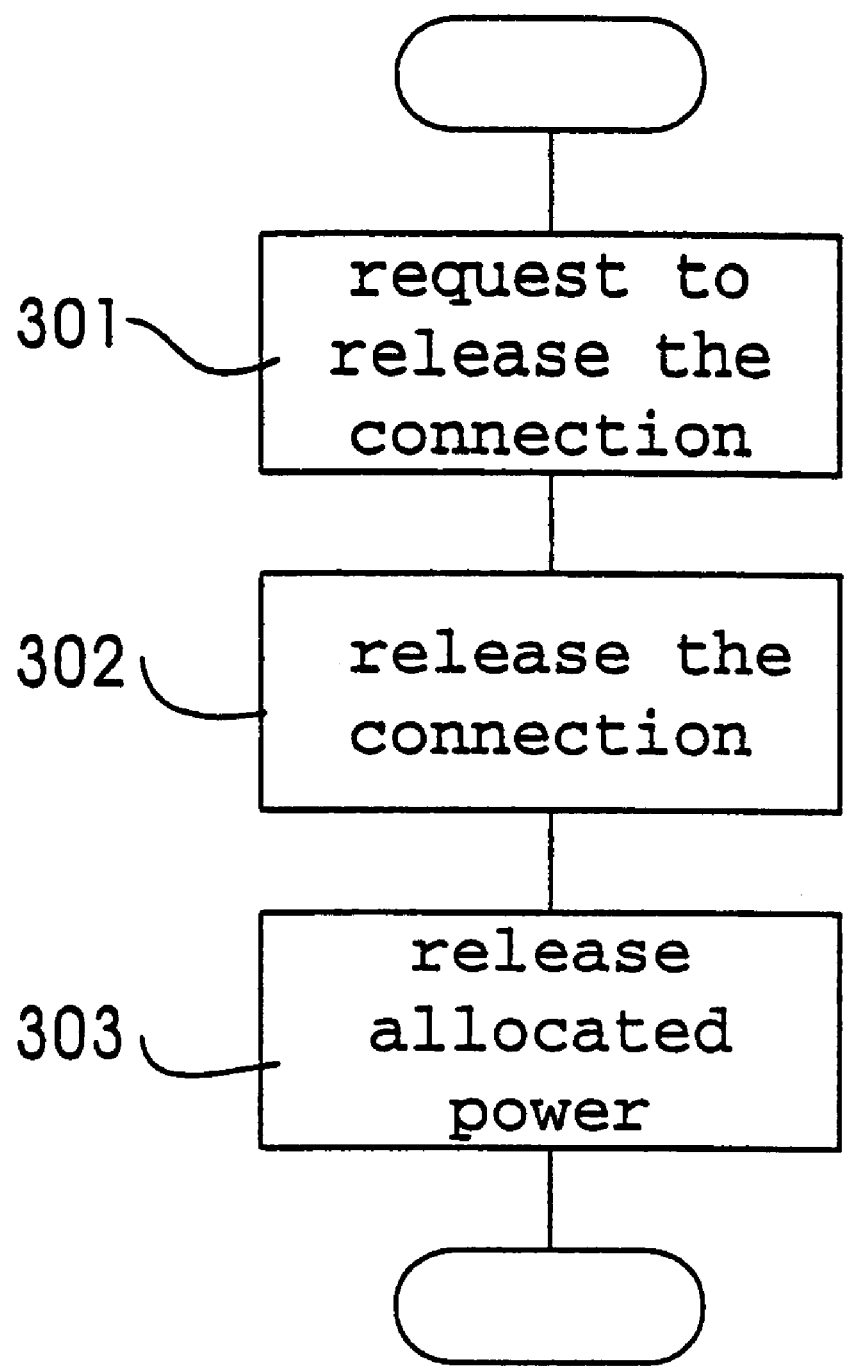
FIG. 3 is a flow chart for call release, according to the method of the invention.

FIG. 3 illustrates a call termination. At step 301 a release request is received. The next step 302 represents the actual release of the connection. When the connection is released the allocated power of the current channel is released to the power bank at step 303.

Figure 4:
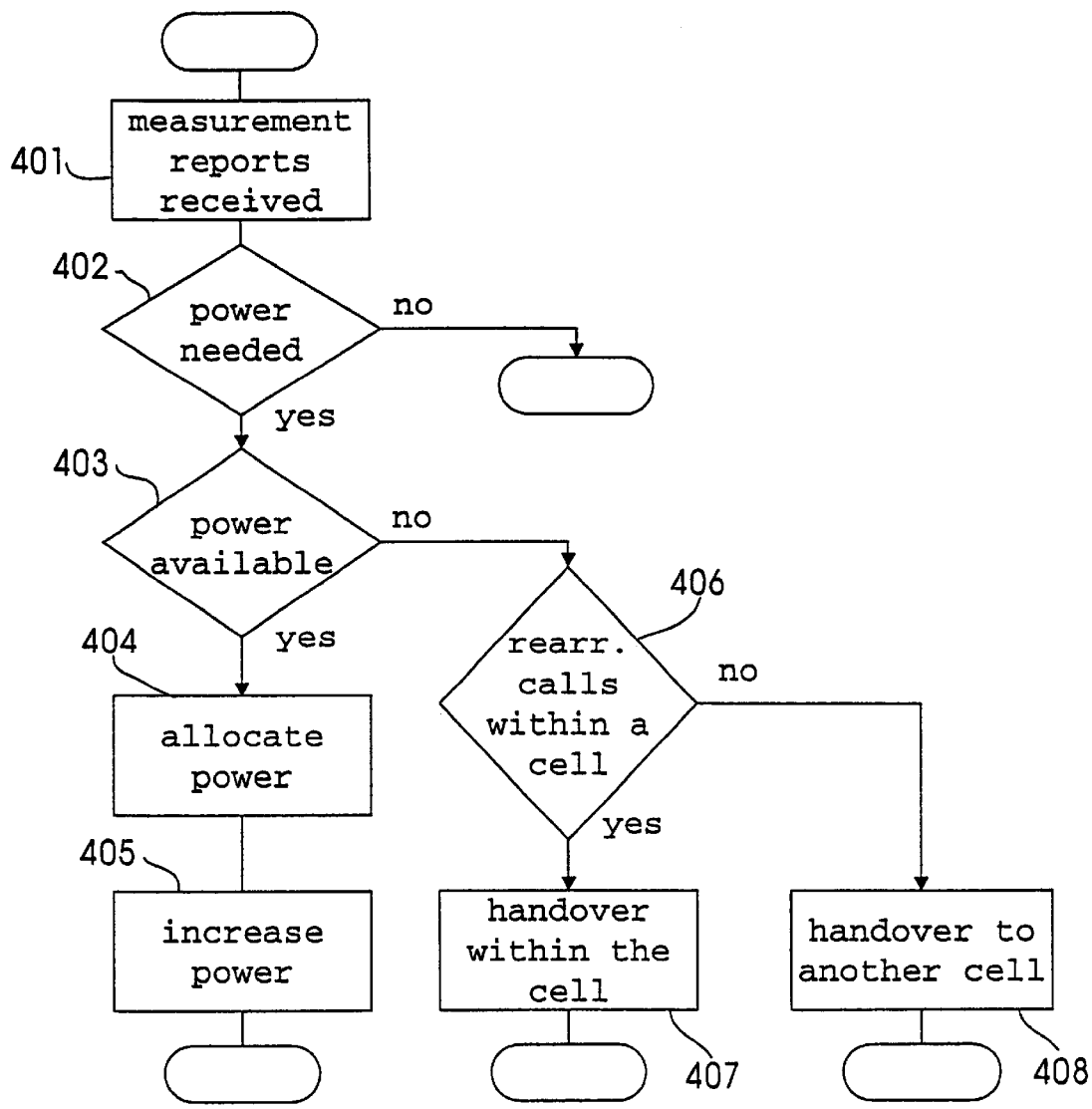
FIG. 4 is a flow chart for call power supervision, according to the method of the invention.

A flowchart for call power supervision is illustrated in FIG. 4. Measurement reports are produced by the system and they are received at the MCPA-system as a basis for rearrangement of calls within a cell or between cells to obtain a more efficient power distribution. For example, if a user walks into a building or walks down to a valley he requires more power, which causes a power allocation request from the BSC. Contrary, if the user leaves a building or a valley he can reduce his amount of allocated power, which causes a power release request from the BSC. At step 401 these measurement reports are received. At step 402 the measurement reports are analysed and if power is needed it proceeds to the next step 403, and if not, the current function just terminates. At step 403 the system asks if there is enough power available and if so it proceeds to step 404, where the required power is allocated. Finally, the amount of power of the requesting entity is increased by the allocated power.

However, if not enough power is available at step 403 the system proceeds to a step 406, where a check if it is possible to do a rearrangement of calls within the cell is performed. If the answer is yes a handover within the cell takes place at step 407, and if not, a handover to another cell takes place at step 408.

As described, power must first be requested, granted and allocated in the new time slot before the handover is started. The power allocated for the old time slot will be released when the handover is finished. This should be handled by a particular function in the system.

An ongoing call may not need all the power, which was allocated in the first place, and therefore, some of this power may be reduced for an ongoing call. If such a reduction can be performed is based on the measurement reports. The power is first reduced and then released in the power bank. This is also handled by a particular function.

Lack of radio power in one time slot should lead to intra cell handover of calls to time slots where enough power can be allocated. It is important that all calls within the overloaded time slot should be analysed. A suitable algorithm is used to select which calls to be handed over, where consideration is taken to the amount of power that has to be released in the overloaded time slot and the amount of power that is likely to be accepted in other time slots.

It should be apparent that the present invention provides an improved method and apparatus for power distribution achieving different grade of services for different call location distributions within a cell, wherein a larger coverage for a particular amount of total radio power is obtained, that fully satisfies the aims and advantages set forth above. Although the invention has been described in conjunction with a specific embodiment thereof, this invention is susceptible of embodiments in different forms, with the understanding that the present disclosure is to be considered as an exemplification of the principles of the invention and is not intended to limit the invention to the specific embodiment illustrated. For example, the invention is applicable to CDMA systems.

What is claimed is:

1. A method of power allocation among carriers within a Multiple Carrier Power Amplifier (MCPA), the method comprising the steps of:

receiving channel requests for establishing channels over a plurality of carriers in a mobile telephone system;

requesting from a power bank a respective amount of power for establishing each of the channels, the power bank representing a maximum amount of power available in the MCPA on a time slot basis;

determining for each channel request if the respective amount of power is available in the power bank by
  determining if the respective amount of power is available in any of a number of time slots and, if not;
  determining if it is possible to perform at least one handover of at least one established channel between said time slots for making available said respective amount of power in a time slot, and if so;
  performing said at least one handover between the time slots, wherein corresponding power release and allocation in the power bank for the time slots are performed;

allocating the respective amount of power from the power bank to each of the channels, and establishing the channels using the respectively allocated channel powers, wherein the mobile system uses time division multiple access (TDMA) technology and the power bank is maintained on a time slot basis.

2. The method according to claim 1, further comprising the steps of:

receiving requests for releasing channels;

releasing the channels; and releasing the respectively allocated channel powers for the released channels to the power bank.

3. The method according to claim 1, further comprising the steps of:

receiving measurement reports including power measurements for established channels;

determining if additional power is needed for the channels and, if so;

determining if the additional power is available for the channels in the power bank and, if so;

allocating a respective amount of additional power to each of the channels; and increasing the power for the channels by the respectively allocated additional channel powers.

4. The method according to claim 3, wherein the step of determining if additional power is available in the power bank comprises the steps of:

determining if the additional power is available in at least one time slot used by the respective established channels and, if not;

determining if it is possible to perform at least one handover of at least one of the established channels between time slots for making available said additional power in the at least one time slot used by the respective established channels, and if so;

performing said at least one handover between time slots, wherein corresponding power release and allocation in the power bank for the time slots are performed.

5. The method according to claim 3, wherein if said additional power is not available for the channel in the power bank, a handover to another cell is performed.

6. A radio frequency Multiple Carrier Power Amplifier (MCPA) apparatus comprising:

means for receiving a plurality of channel requests; defining means for requesting from a power bank a respective amount of power for establishing channels over a plurality of carriers in a mobile telephone system for each of the plurality of channel requests, the power bank representing a maximum amount of power available in the MCPA on a time slot basis;

means for determining for each of the plurality of channel requests if the respective amount of power Is available in the power bank to establish the channels, including means for determining if the required amount of power is available in any of a number of time slots;

means for determining if it is possible to perform at least one handover of at least one established channel between said time slots for making available said required amount of power in a time slot when it is determined that the required amount of power is not available in any of the number of time slots; and means for performing said at least one handover between the time slots when it is determined that it is possible to perform at least one handover to make available said required amount of power, wherein corresponding power release and allocation to and from the power bank for the time slots are performed;

means for allocating the respective amount of power from the power bank to each of the channels; and means for establishing the channels using the respectively allocated channel powers.

7. The apparatus according to claim 6, further comprising a control system for controlling the operation of said MCPA.

8. The apparatus according to claim 7, further comprising:

means for receiving requests for releasing channels;

means for releasing the channels; and means for releasing the respectively allocated channel powers for the released channels to the power bank.

9. The apparatus according to claim 7, further comprising:

means for receiving measurement reports including power measurements for established channels;

means for determining if additional power is needed for the channels;

means for determining if the additional power is available for the channel in the power bank;

means for allocating a respective amount of additional power to each of the channels; and means for increasing the power for the channels by the respectively allocated additional channel powers.

10. The apparatus according to claim 9, further comprising:

means for determining if the additional power is available in at least one time slot used by the respective established channels;

means for determining if it is possible to perform at least one handover of at least one of the established channels between time slots for making available said additional power in the at least one time slot used by the respective established channels; and means for performing said at least one handover between time slots, wherein corresponding power release and allocation in the power bank for the time slots are performed.

11. The apparatus according to claim 10, further comprising means for performing handover to a cell other than a cell associated with said time slots when additional power is not available in the power bank.

* * * * *